(12) United States Patent
Stanfill (10) Patent No.: US 7,949,839 B2
(45) Date of Patent: May 24, 2011

(54) MANAGING MEMORY PAGES (75) Inventor: Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 12/688,240

(22) Filed: Jan. 15, 2010

(65) Prior Publication Data

US 2010/0122048 A1    May 13, 2010

Related U.S. Application Data (63) Continuation of application No. 11/169,246, filed on Jun. 27, 2005, now Pat. No. 7,673,105.

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. .... 711/159; 711/118; 711/209; 711/E12.07

(58) Field of Classification Search ................... 711/118, 711/159, 209, E12.07
See application file for complete search history.

(56) References Cited

U.S. PATENT DOCUMENTS

| | | | |
|---|---|---|---|
| 5,125,086 A | 6/1992 | Perazzoli, Jr. | |
| 5,455,944 A | 10/1995 | Haderle et al. | |
| 5,504,899 A | 4/1996 | Raz | |
| 5,530,848 A | 6/1996 | Gilbert et al. | |
| 5,586,312 A | 12/1996 | Johnson et al. | |
| 5,617,537 A * | 4/1997 | Yamada et al. | 709/214 |
| 5,857,204 A | 1/1999 | Lordi et al. | |
| 6,199,141 B1 | 3/2001 | Wienreb et al. | |
| 6,327,644 B1 | 12/2001 | Beardsley et al. | |
| 6,594,751 B1 * | 7/2003 | Leivent | 711/209 |

FOREIGN PATENT DOCUMENTS

| | | |
|---|---|---|
| EP | 0250702 | 1/1988 |
| EP | 0510832 | 10/1992 |

OTHER PUBLICATIONS

Sharpened.net, computer glossary term "queue", http://www.sharpened.net/glossary/definition.php?queue, Jun. 18, 2002 The wayback machine at http://web.archive.org/ was used to find this webpages content at the disclosed date and this search result is also provided.*
Kroeger, R. et al., "The Relax Transactional Object Management System," *Security and Persistence*, Springer-Verlag, 339-350, 1990.
"QuickStudy: Serial vs. Parallel Storage," Russel Kay, Nov. 17, 2003, Http://www.computerworld.com/action/article.do?command=viewArticleBasic&articleId=87095 p. 1-3.
Supplemental European Search Report in European application No. 06785341, dated Dec. 18, 2008, 6 pages.

* cited by examiner

*Primary Examiner* — Matt Kim
*Assistant Examiner* — Michael Alsip
(74) *Attorney, Agent, or Firm* — Fish & Richardson P.C.

(57) ABSTRACT

A method, and corresponding software and system, is described for paging memory used for one or more sequentially-accessed data structure. The method includes providing a data structure representing an order in which memory pages are to be reused; and maintaining the data structure according to a history of access to a memory page associated with one of the sequentially-accessed data structures. A position of the memory page in the order depends on a transition of sequential access off of the memory page.

20 Claims, 7 Drawing Sheets

MANAGING MEMORY PAGES

CROSS-REFERENCE TO RELATED APPLICATIONS

This application is a continuation application of and claims priority to U.S. application Ser. No. 11/169,246, filed on Jun. 27, 2005, now U.S. Pat. No. 7,673,105.

BACKGROUND

The invention relates to managing memory pages.

It is useful to use a volatile memory store (e.g., random access memory (RAM)) to work with data that is also stored in a non-volatile memory store (e.g., one or more disk drives). For example, the volatile memory store typically has faster access and read times than the non-volatile memory store. The address spaces of the volatile memory store and of the non-volatile memory store can be organized into pages that span a predetermined number of contiguous address locations. A computer system uses a paging technique to allocate memory pages from the volatile memory store to be used, for example, by programs or data structures. The non-volatile memory store is typically much larger than the volatile memory store. A virtual memory scheme can be used to allow pages in the volatile memory store that are not in use (e.g., not currently being written to or read from) to be written to the non-volatile memory store and then read back from the non-volatile memory store again later when needed. Thus, pages in the volatile memory store are "recycled" for use by various programs and/or data structures. To reduce the overhead associated with moving pages back and forth, some techniques recycle pages according to a least-recently used (LRU) approach. In the LRU approach, if a page that has been written to the non-volatile memory store is to be moved to the volatile memory store and there are no more free pages in the volatile memory store, then a page selected to be recycled (or "swapped" or "paged out") from the volatile memory store to the non-volatile memory store is the page that has been least-recently used (e.g., least-recently read from or written to).

SUMMARY

In a general aspect, the invention features a method, and corresponding software and system, for paging memory used for one or more sequentially-accessed data structure. The method includes providing a data structure representing an order in which memory pages are to be reused; and maintaining the data structure according to a history of access to a memory page associated with one of the sequentially-accessed data structures, whereby a position of the memory page in the order depends on a transition of sequential access off of the memory page.

This aspect can include one or more of the following features:

The transition of sequential access off of the memory page corresponds to a pointer transitioning off of the memory page.

The position of the memory page in the order depends on whether the transition of a sequential access corresponds to transition of write access off of the memory page.

Maintaining the data structure according to a history of access to a memory page associated with one of the sequentially-accessed data structures includes: placing an identifier for the memory page at a first end of the data structure representing the order in response to a transition of write access off of the memory page; and placing an identifier for the memory page at a second end of the data structure representing the order in response to the sequentially-accessed data structure associated with the memory page being closed.

The method further includes reusing a memory page from the first end of the data structure representing the order.

The method further includes reusing the memory page from the first end of the data structure after determining that a list of free memory pages is empty.

Reusing the memory page includes writing current contents of the memory page to a non-volatile memory store.

Reusing the memory page further includes writing a memory page from the non-volatile memory store to the memory page.

The sequentially-accessed data structure associated with the memory page includes a queue.

In a general aspect, the invention features a method, and corresponding software and system, for paging memory used for one or more sequentially-accessed data structure, including reusing a memory page associated with a sequentially-accessed data structure according to a most-recently used approach in a first case and according to a least-recently used approach in a second case.

This aspect can include one or more of the following features:

The first case includes a write pointer transitioning off of the memory page.

The second case includes an access entity closing the sequentially-accessed data structure.

The second case includes a read pointer transitioning off of the memory page.

Aspects of the invention can include one or more of the following advantages:

Ordering pages for reuse can provide a better prediction of which pages are likely to be used again soon for a memory system that stores queues or other sequential I/O data structures. A page that has just been written (i.e., a write pointer has just moved off the page) is not likely to be used again soon since a read pointer has to "catch up" to the write pointer. Accordingly, these pages are recycled first. Further, pages for queues that have just been closed may be re-opened and used again soon, so they are not recycled until later. A page that has been closed for a while is recycled somewhere in between.

Use of a queue-specific paging algorithm can provide improved efficiency over use of a paging algorithm that does not take advantage of queue structures or access patterns. Paging of data storing queues can be improved by taking advantage of queue access history in determining which pages to reuse. For example, based on the access history, some pages may be expected to be accessed again sooner than others. This improvement can lead to a higher likelihood of needed pages being in working storage, thereby reducing delays caused by transfer of data back to working storage.

Other features and advantages of the invention will become apparent from the following description, and from the claims.

DESCRIPTION

Figure 1:
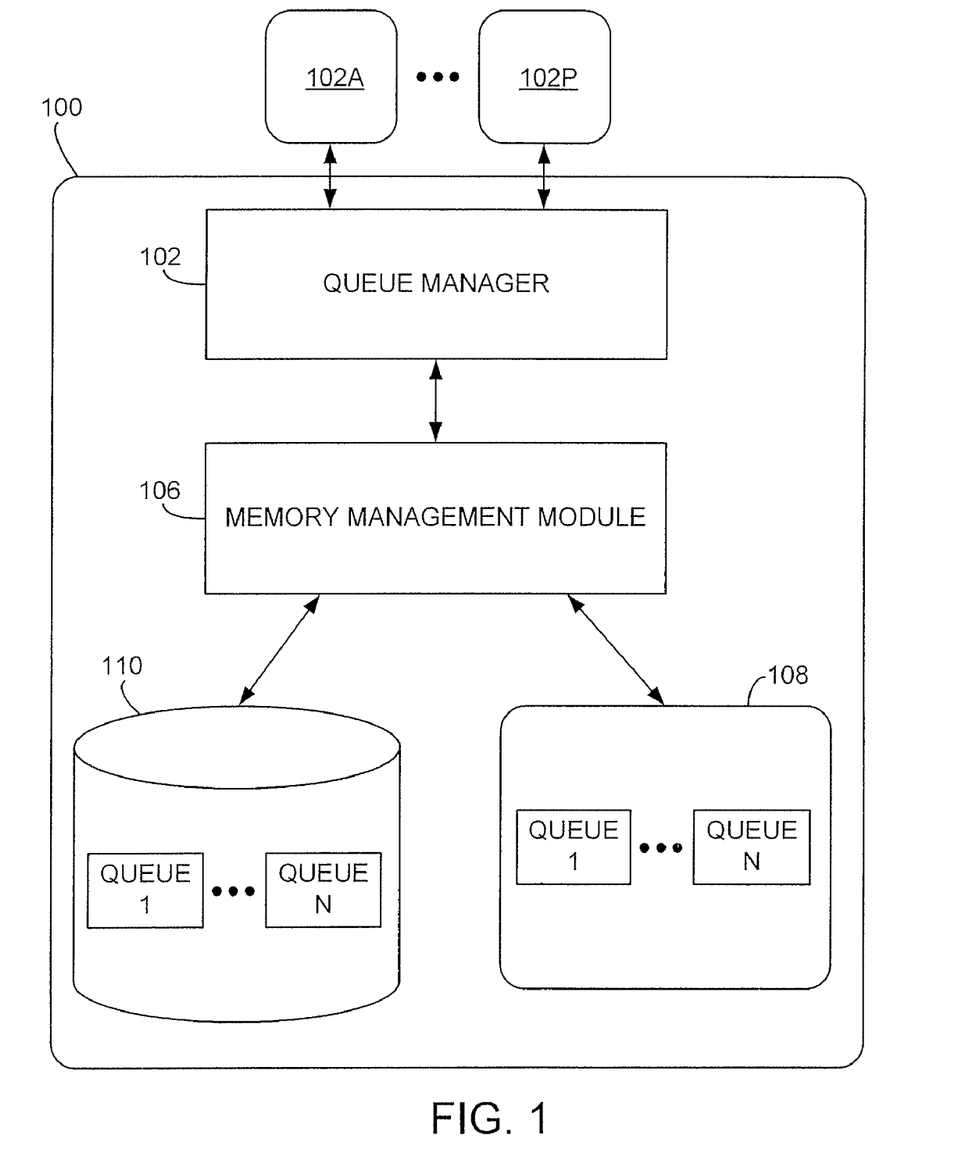
FIG. 1 is a diagram of a queueing system.

Referring to FIG. 1, queueing system 100 enables access entities 102A-102P to add messages to one or more of a set of queues QUEUE_1- QUEUE_N, and to read messages from the queues. An access entity interacts with the system 100 through a queue manager 102. The queue manager 102 uses a memory management module (MMM) 106 to assist in swapping pages between a volatile memory store 108, which is a temporary working storage that provides relatively fast access for reading and writing data, and a non-volatile memory store 110, which is a permanent storage that provides relatively more persistence of data and which may provide relatively slower access for reading and writing than the volatile store. The MMM 106 may be implemented in software or hardware or both. The MMM translates pages addresses between a volatile memory address space and a non-volatile memory address space. The MMM also monitors page references to volatile memory and can detect a reference to a page that is unavailable (e.g., the volatile memory page has been written to non-volatile memory and then recycled for new use). The MMM responds by alerting the queue manager 102 about this "page fault." The queue manager 102 then reads the referenced page from non-volatile memory and copies it into a free page in volatile memory. If there are no free pages in volatile memory, then the queue manager 102 recycles a page according to a "recycle list" as described in more detail below. The queue manager 102 and MMM 106 can be implemented with any of a variety of operating systems and computing environments. The queue manager and/or the MMM 106 can be integrated into an operating system. Alternatively, the operating system may have a separate virtual memory system for managing pages that are not assigned to the queue manager 102.

A given queue (e.g., QUEUE_2) may store a series of records, including sequential queue messages and records relating to managing those messages, in a set of "queue pages." Depending on the relative sizes of a message and a queue page, a queue page may hold one or more messages, or a portion of one message. The queue manager 102 assigns a queue a set of queue pages and can add pages to the set as the queue grows. In the illustrated embodiment, all of the queue pages in the set are stored in the non-volatile memory store 110 and a subset of active queue pages are stored in the volatile memory store 108.

The "sequential" aspect of the queue (or other sequentially-accessed data structure) refers to the logical ordering of the messages (or other elements of the data structure). The storage locations of the messages are not necessarily at sequential addresses in a physical or virtual address space of the system 100.

If the contents of a queue page in the volatile memory store 108 are changed, that queue page is marked as "dirty." When a dirty queue page is removed from the volatile memory store 108, the old copy of the queue page in the non-volatile memory store 110 is updated with the changes (i.e., the queue page is "synchronized" to the non-volatile memory store 110). A dirty queue page may also be synchronized to the non-volatile memory store 110 before the queue page is removed from the volatile memory store 108. The queue manager reclaims some or all of the queue pages for a queue after the queue no longer needs them (e.g., after the queue is deleted).

Figure 2A:
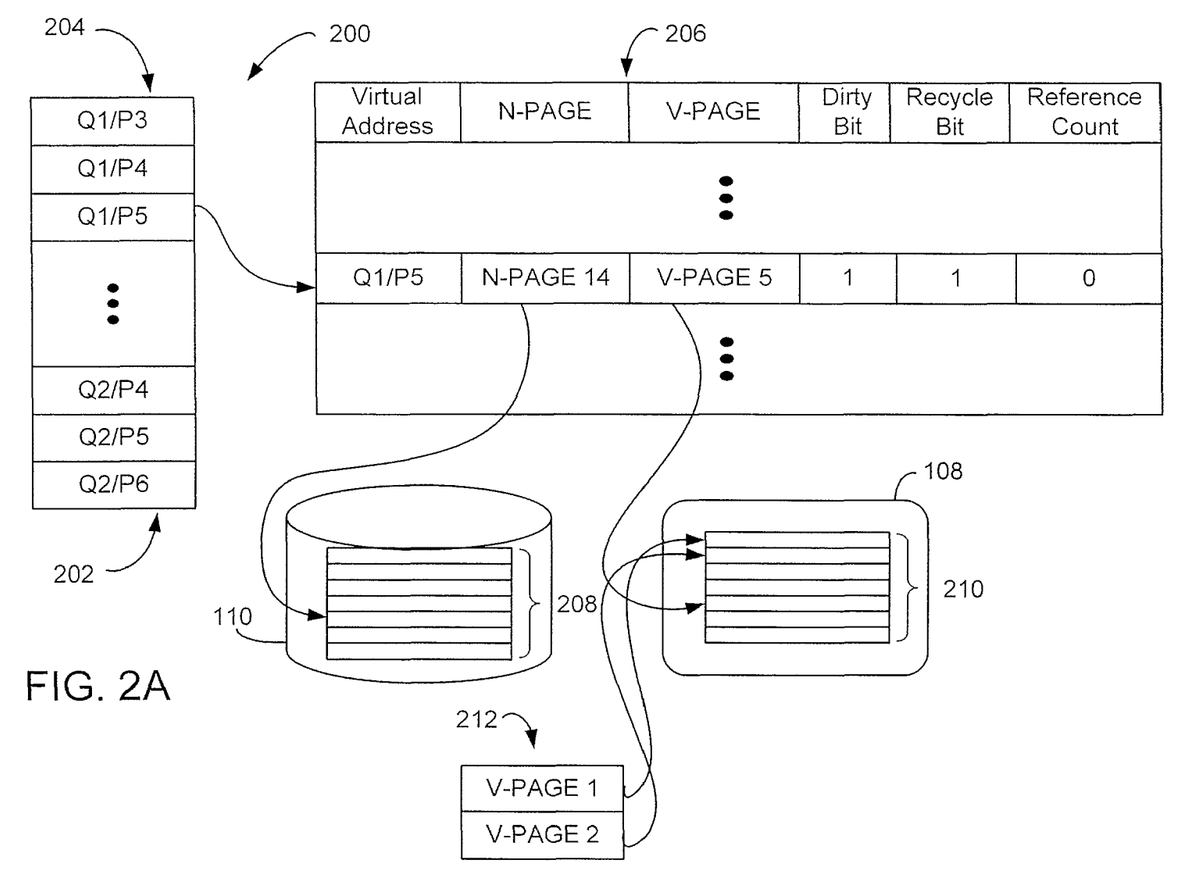
FIG. 2A is a diagram of a page table linking a recycle list to a volatile and a non-volatile memory space.

Referring to FIG. 2A, a recycle list 200 identifies pages in volatile memory that can potentially be recycled. The recycle list 200 has a first "head" end 202 and a second "tail" end 204. Pages can be added to either the tail or head end, as described below, and pages are removed from the head end 202. The recycle list can be implemented, for example, as a doubly-linked list.

In one implementation, the recycle list 200 stores a "virtual address" that identifies a queue page in a page table 206 (e.g., "Q1/P5" identifying queue page "5" assigned to QUEUE_1). The page table 206 includes an entry for each of the queue pages assigned to a queue in the queueing system 100. In the illustrated the page table 206 includes, for each entry, a non-volatile memory page address "N-PAGE" within a non-volatile memory space 208 and a volatile memory page address "V-PAGE" within a volatile memory space 210. The volatile memory page address may be empty (e.g., corresponding to an unused address value) for a queue page that is not stored in the volatile memory store 108. The page table 206 includes a "recycle bit" that indicates whether a queue page is in the recycle list 200. The page table includes a "reference count" that indicates how many access entities are accessing a queue page.

Figure 3A:
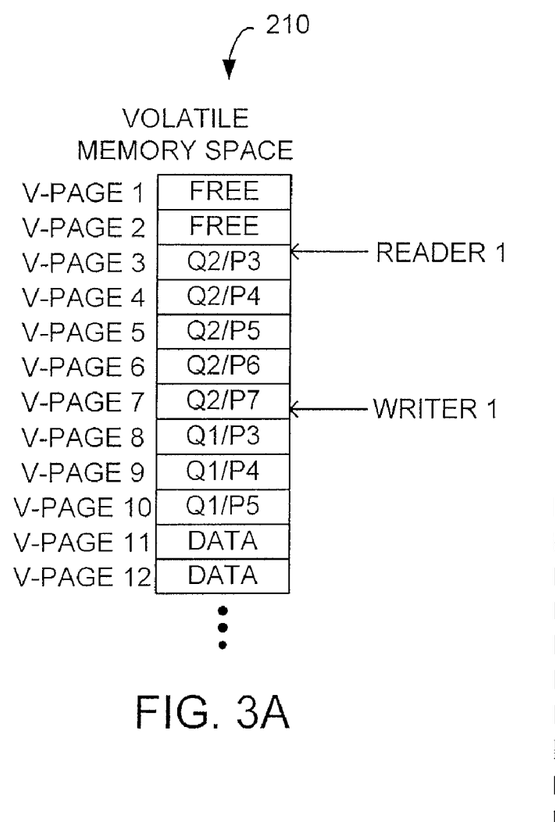
FIGS. 3A and 3B are diagrams of memory pages in a volatile and non-volatile memory space, respectively.
Figure 3B:
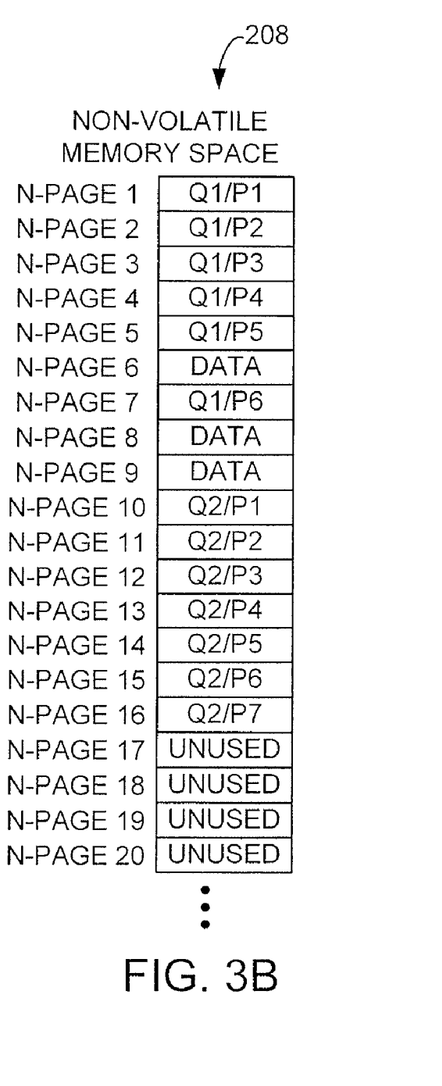

Each queue has an assigned set of queue pages stored in the non-volatile memory store 110 (e.g., QUEUE_2 has pages Q2/P1-Q2/P7 stored in addresses N-PAGE_10-N-PAGE_16 in FIG. 3B). Some queue pages may have copies both in volatile and non-volatile memory (e.g., pages Q2/P3-Q2/P7 in FIGS. 3A and 3B). For queue pages that are stored in the volatile memory store 108, page table 206 uses a "dirty bit" to indicate whether there are changes to the contents of the queue page that have not yet been synchronized back to the non-volatile memory store 110.

For example, messages newly added to a queue may only have been stored in volatile memory. Queue pages that store queue messages that have been committed may have been stored in both volatile and non-volatile memory, since the queue pages are synchronized from volatile memory to non-volatile memory in a commit operation. (Any of a number of schemes can be used to synchronize committed messages to ensure messages are not lost. One approach to committing messages is described in copending/concurrently filed application "MANAGING MESSAGE QUEUES," which is incorporated herein by reference.) The volatile memory page storing a queue page may have been recycled (e.g., for use by a different queue), leaving only a copy in non-volatile memory.

One or more access entities can open a queue for reading and/or writing. An access entity can open a queue to add one or more messages to the end of the queue. An access entity can open a queue to read committed messages from the front of the queue or from a particular location in the queue (e.g., a location reached when previously reading from the queue). When a queue is opened for access by an access entity, the queueing system 100 performs opening tasks such as setting up a read and/or write pointer for the access entity. After an access entity is finished accessing a queue, the access entity closes the queue and the queueing system 100 performs appropriate closing tasks. Multiple access entities can concurrently access the same queue. Thus, a queue can be opened for access by some access entities, and closed for other access entities.

When an access entity opens a queue, the access entity increments the reference count for the queue page that is being accessed. If the queue page to be accessed is not already in the volatile memory store 108, then that queue page is copied from the non-volatile memory store 110 to the volatile memory store 108. After the access entity is finished accessing a queue page (e.g., after closing the queue or after writing beyond the end of the queue page), the access entity decrements the reference count for that queue page.

The queueing system 100 keeps track of where an access entity is reading data with a read pointer and where an access entity is adding (i.e., writing) data with a write pointer. While an access entity is reading from or writing to a queue, the queue pages that are being accessed are in the volatile memory store 108. The queueing system 100 keeps track of volatile memory pages that are available by means of a free list 212. When a new queue page is to be copied from the non-volatile memory store 110 to the volatile memory store 108 and there are no free pages (i.e., the free list 212 is empty), the queueing system 100 recycles a volatile memory page according to the recycle list 200.

To recycle a volatile memory page, the queueing system 100 looks for a page to recycle by checking the page identified at the head 202 of the recycle list 200. If the identified page qualifies as a page that can be recycled according to predetermined criteria (e.g., the page has a reference count of zero indicating that it is not currently referenced by a read or write pointer), then the current contents of the page are written to the non-volatile memory store 110 (if necessary) and the page is free to be allocated (and is removed from the recycle list 200). If the current contents of the page have already been synchronized to non-volatile memory, then the queueing system 100 frees the page without writing to non-volatile memory. If the identified page does not qualify as a page that can be recycled, then the page is removed from the recycle list and the new head 202 of the recycle list is checked for a recyclable page.

In one implementation, there are two cases for which the queueing system 100 adds a volatile memory page to the recycle list 200 (i.e., the page becomes a potential candidate to be freed):

Case 1: a write pointer moves off of the page, no other read or write pointers point to the page, and the page is not already on the recycle list 200.

Case 2: the queue that is using the page is closed, no other read or write pointers point to the page, and the page is not already on the recycle list 200.

Case 1 may occur, for example, when an access entity that is adding a series of messages to a queue fills a queue page with messages. In Case 1, the queueing system 100 adds the page to the head 202 of the recycle list 200. This case corresponds to a most-recently used (MRU) approach, since more recently written pages are recycled before less recently written pages.

In Case 2, the queueing system 100 adds the page to the tail 204 of the recycle list 200. This case corresponds to a least-recently used (LRU) approach, since pages are used from the head of the recycle list and therefore less recently closed pages are recycled before more recently closed pages.

In other implementations, other cases can be included for adding a page to the recycle list 200. For example, another case in which a page can be added to the tail 204 of the recycle list 200 is:

Case 3: a read pointer moves off of the page, no other read or write pointers point to the page, and the page is not already on the recycle list 200.

Other implementations can include any of a variety of rules for maintaining the order of pages within the recycle list according to the history of access to each page. By arranging for the position of at least some of the memory pages in the order to depend on a transition of sequential access off of the memory page (e.g., a write pointer moving off of the page), the system can take advantage of statistical properties of sequentially-accessed data structures to improve paging efficiency.

Pages in the free list 212 correspond to pages that are no longer needed and therefore are no longer associated with a queue page. There are a variety of cases for which the queueing system 100 adds a page to the free list 212. In one case, the system 100 frees a page that holds queue messages that have been read by all access entities that have subscribed to the queue as a reader (i.e., all of the subscriber's read pointers have gone through each message on the page and have left the page). The queueing system 100 may free a page for any of a variety of other reasons. For example, a page is freed when all of the messages on the page have been removed or "rolled back."

In some implementations, pages are freed according to a time limit. For example, a page is freed after the queue associated with the page has been closed for more than a predetermined amount of time (e.g., 2 minutes). In another case, a page is freed after the page has not been accessed for more than a predetermined amount of time (e.g., 10 minutes) even if the associated queue is open.

Additionally, the queue manager 102 may free volatile memory pages used by other programs or data structures that can then be used by the queueing system 100 for allocating queue pages. The queueing system 100 can use a global free list 212 that is also used for freeing all volatile memory pages, or alternatively, can use a separate free list 212 for volatile memory pages used for queue pages.

Figure 2B:
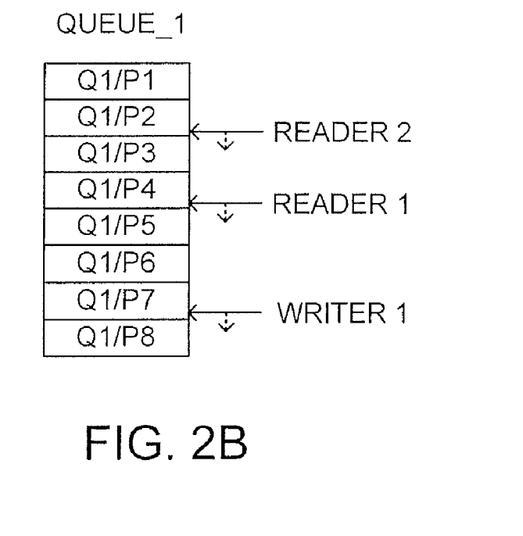
FIG. 2B is a diagram of memory pages.

FIG. 2B shows an example of a set of pages Q1/P1-Q1/P8 for QUEUE_1 ordered sequentially according to their virtual addresses. In this example, a writer access entity is writing a series of messages to the queue and two reader access entities are reading the messages as they become available. The writer access entity has a write pointer WRITER_1 that writes messages on pages with sequentially increasing virtual addresses. After the write pointer WRITER_1 moves from page Q1/P7 to page Q1/P8, the page Q1/P7 is eligible to be placed onto the head 202 of the recycle list 200 under Case 1. After the read pointer READER_2 moves from page Q1/P2 to page Q1/P3, the page Q1/P2 is eligible to be placed onto the tail 204 of the recycle list 200 under Case 3.

A first reader access entity has a read pointer READER_1 that lags the write pointer WRITER_1 by some number of queue pages. This lag can shrink or grow as the access entities interact with the queueing system 100. A second reader access entity has a read pointer READER_2 that also lags the write pointer WRITER_1. If free pages remain available for the writer, the readers are able to access the written pages from the volatile memory 108. If free pages are not available (e.g., if the volatile memory space fills up due to a large lag by a reader), then some of the written pages may be recycled. For example, under this page management approach, a most recently used page may be repeatedly recycled, leaving a sequence of least recently used pages available in the volatile memory for the lagging reader.

After QUEUE_1 is closed, any queue pages not already on the recycle list 200 are eligible to be placed onto the tail 204 of the recycle list 200. Any such queue pages for the recently closed queue placed onto the tail 204 remain available in the volatile memory 108 for access by another access entity until the pages "scroll" up the recycle list 200 from the tail 204 to the head 202.

FIG. 3A shows an example of queue pages in a memory address space 210 for the volatile memory store 108. Page addresses V-PAGE_1-V-PAGE_2 are free and are therefore included in the free list 212 shown in FIG. 3D. Addresses V-PAGE_3-V-PAGE_7 are used to store queue pages for QUEUE_2. A reader access entity has a read pointer READER_1 located within V-PAGE_2 to read messages in queue page Q2/P3 (in this example, a queue page stores more than one message). A writer access entity has a write pointer WRITER_1 located within V-PAGE_7 to write messages in queue page Q2/P7. Addresses V-PAGE_8-V-PAGE_10 are used to store queue pages for a QUEUE_1 that is closed. Addresses V-PAGE_11-V-PAGE_12 are used to store other data.

FIG. 3B shows an example of a memory address space 208 for the non-volatile memory store 110. The non-volatile memory store 110 stores queue pages for QUEUE_1 and QUEUE_2 that have been synchronized (e.g., due to a commit operation), some of which are also currently loaded into the volatile memory store 108. In this example, the queue page Q2/P7 in volatile memory is being written with new messages that have not yet been synchronized to non-volatile memory.

Figure 3C:
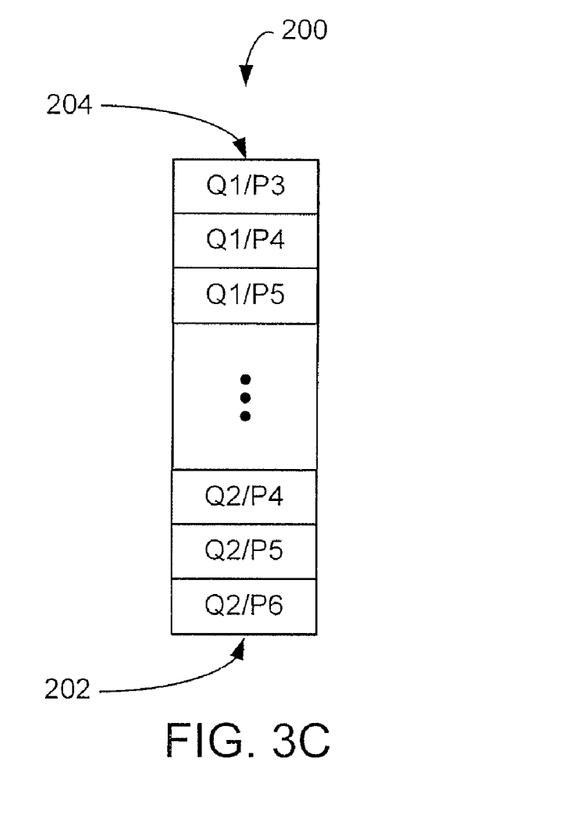
FIGS. 3C and 3D are diagrams of a recycle list and a free list corresponding to the volatile memory space of FIG. 3A.
Figure 3D:
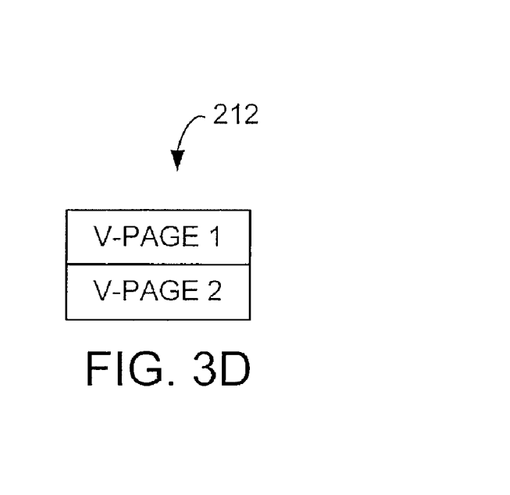

FIG. 3C shows a recycle list 200 corresponding to the history of activity in the volatile memory store 108. For example, since the QUEUE_1 has just been closed, the queueing system 100 has marked the queue pages Q1/P3-Q1/P5 for recycling according to an LRU approach by placing these virtual addresses onto the tail end 204 of the recycle list 200. The write pointer WRITER_1 has recently moved off of the queue pages Q2/P4, Q2/P5, and Q2/P6 (in this order). So the queueing system 100 has placed these virtual addresses onto the head end 202 of the recycle list 200 rather than the tail end 204.

Figure 4A:
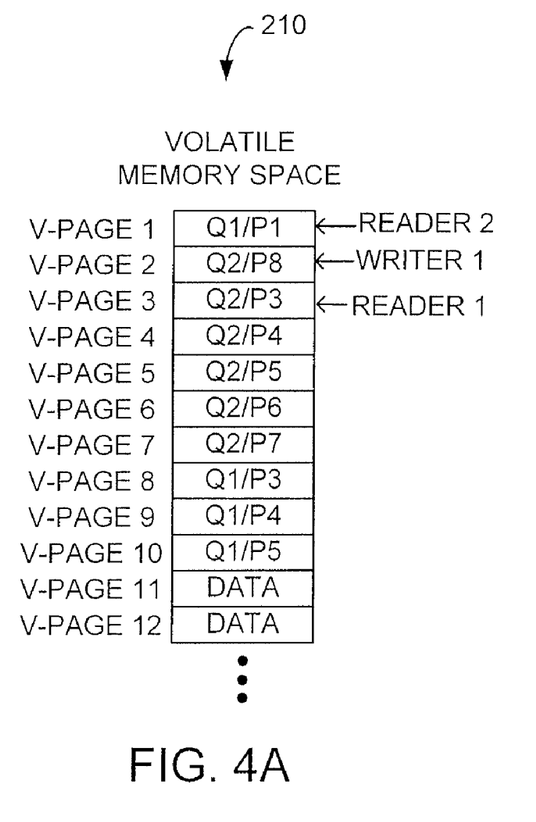
FIGS. 4A and 4B are diagrams of memory pages in a volatile and non-volatile memory space, respectively.
Figure 4B:
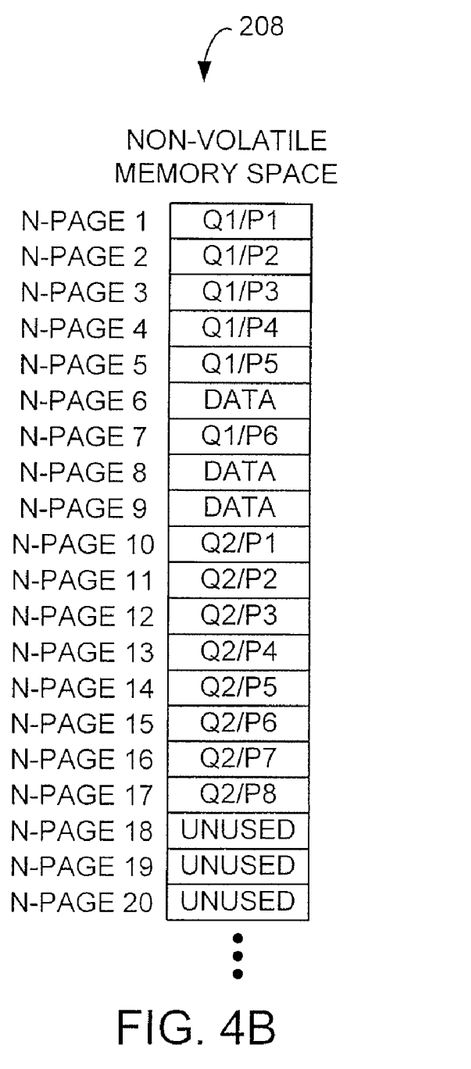
Figure 4C:
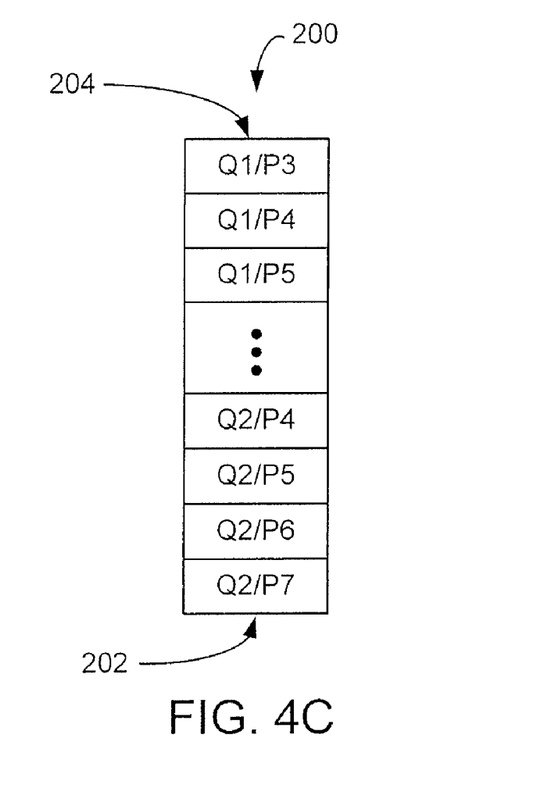
FIGS. 4C is a diagram of a recycle list corresponding to the volatile memory space of FIG. 4A.

FIGS. 4A-4C show the state of the volatile address space 210, the non-volatile address space 208, and the recycle list 200, respectively, after subsequent activity. The write pointer WRITER_1 has moved onto a new queue page Q2/P8 at address V-PAGE_2 allocated from the free list 212. A second reader access entity has a read pointer READER_2 located within V-PAGE_1 to read messages in queue page Q1/P1 allocated from the free list 212. After these page allocations, the free list 212 is empty.

Figure 5A:
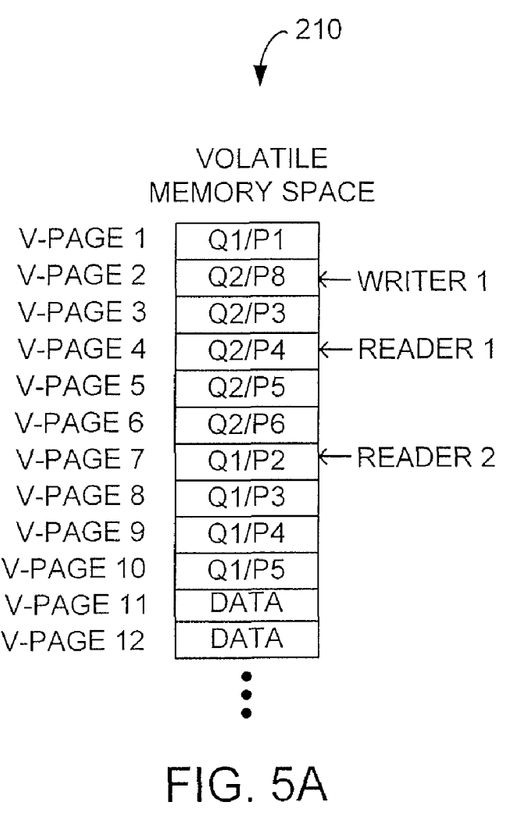
FIGS. 5A and 5B are diagrams of memory pages in a volatile and non-volatile memory space, respectively.
Figure 5B:
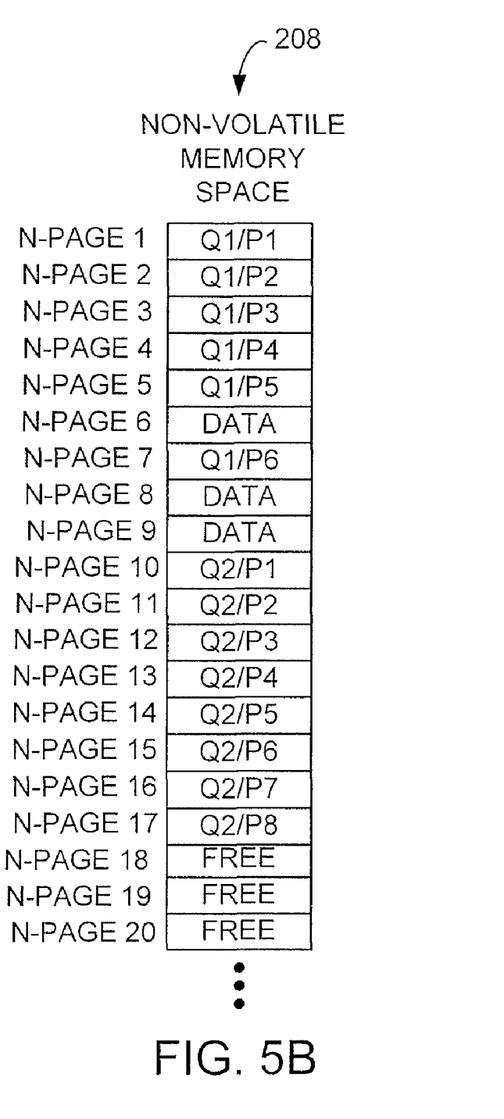
Figure 5C:
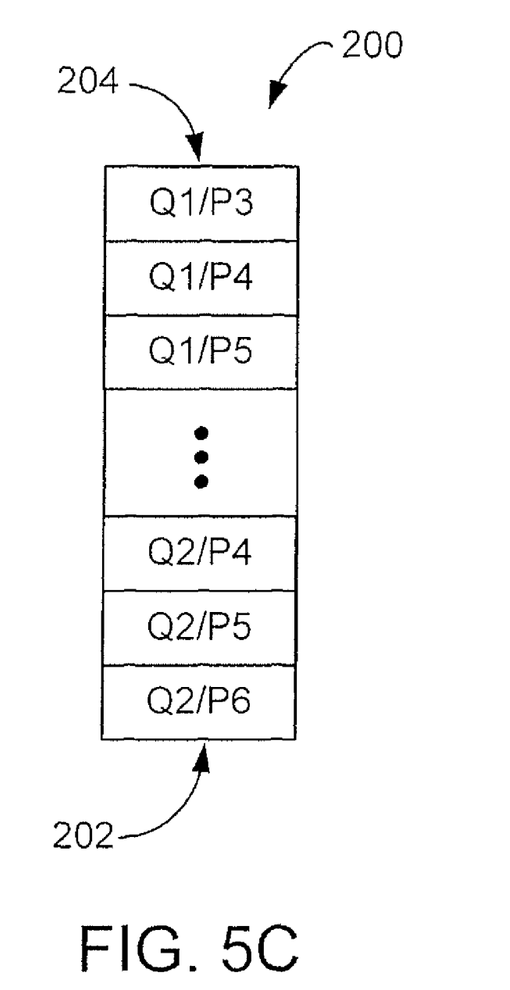
FIGS. 5C and 5D are diagrams of a recycle list and a free list corresponding to the volatile memory space of FIG. 5A.
Figure 5D:
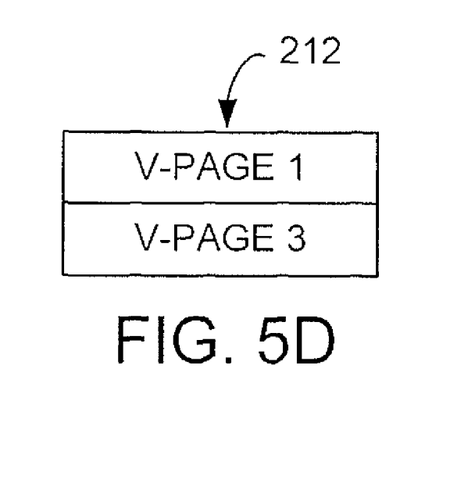

FIGS. 5A-5C show the state of the volatile address space 210, the non-volatile address space 208, and the recycle list 200, respectively, after a page allocation from the recycle list 200. The write pointer WRITER_1 remains on queue page Q2/P8. The read pointer READER_1 has moved onto queue page Q2/P4 at V-PAGE_4. The read pointer READER_2 has moved onto queue page Q1/P2 allocated from the head 202 of the recycle list 200 (FIG. 4C). After this page allocation, the new head 202 of the recycle list 200 is Q2/P6 (FIG. 5C). Since queue pages QUEUE_1A and QUEUE_1C are no longer needed, the addresses V-PAGE_1 and V-PAGE_3 are placed onto the free list 204 (FIG. 5D).

In this example, a single writer and a single reader access a given queue. In other examples, multiple access entities (e.g., subscribers and/or writers) can interact with the same queue (each having its own read or write pointer). The same cases described above for recycling a memory page can be used when multiple access entities interact with a queue.

The queueing system 100 can use other techniques in combination with the techniques described herein to increase system performance. For example, the queue manager 102 can predict when pages are going to be requested and recycle multiple pages at a time. The queue manager 102 can also modify the recycle list, for example, by reordering pages in the recycle list after they have been added.

The page management approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for paging memory used for one or more queues, including:
   providing a recycle list data structure that identifies memory pages on a recycle list including at least some memory pages that store portions of the queues, and that represents an order in which the identified memory pages are to be reused;
   maintaining the recycle list data structure including:
      adding an identifier for a first memory page to a first end of the recycle list in response to a write pointer moving off the first memory page; and
      adding an identifier for a second memory page to a second end of the recycle list in response to a queue that uses the second memory page being closed;
   providing a free list data structure that identifies memory pages on a free list that are unallocated;
   providing a volatile memory store;
   providing a non-volatile memory store; and
   reusing the first memory page identified by the recycle list in response to the free list being empty after writing the contents of the first memory page from the volatile memory store to the non-volatile memory store.

2. The method of claim 1, wherein the transition of sequential access off of the memory page corresponds to a pointer transitioning off of the memory page.

3. The method of claim 1, wherein the position of the memory page in the order depends on whether the transition of a sequential access corresponds to transition of write access off of the memory page.

4. The method of claim 1, further including reusing a memory page from the first end of the recycle list data structure.

5. The method of claim 4, further including reusing the memory page from the first end of the recycle list data structure after determining that a list of free memory pages is empty.

6. The method of claim 4, wherein reusing the memory page includes writing current contents of the memory page to the non-volatile memory store.

7. The method of claim 6, wherein reusing the memory page further includes writing a memory page from the non-volatile memory store to the memory page.

8. The method of claim 1, further including reusing a memory page identified by the recycle list data structure to store a portion of one of the queues.

9. The method of claim 8, wherein the reused memory page identified by the recycle list data structure stored a different portion of one of the queues before being reused.

10. The method of claim 8, wherein the portion of one of the queues being stored to the reused memory page includes a queue message being written to a queue.

11. The method of claim 1, wherein the memory pages that store the queues store queue messages and records relating to managing the queue messages.

12. The method of claim 1, where logically ordered elements stored in the queues include multiple sequential queue messages.

13. The method of claim 12, where the logically ordered elements include at least one record related to the sequential queue messages.

14. The method of claim 1, where logically ordered elements stored in the queues are written by a write access entity and read by at least one read access entity.

15. The method of claim 14, where the write access entity and the read access entity are different.

16. The method of claim 1, further including:
opening a first queue in response to a request from a first access entity including storing a portion of the first queue in the first memory page after writing the contents of first memory page from the volatile memory store to the non-volatile memory store; and
providing a write pointer for the first queue to the first access entity.

17. The method of claim 16, further including providing one or more read pointers for the first queue to one or more additional access entities.

18. The method of claim 16, further including moving a second memory page storing a portion of the first queue to the recycle list after determining that none of the write pointer or read pointers are pointing to the second memory page.

19. Software stored on a computer-readable storage medium, for paging memory used for one or more queues, the software including instructions for causing a computer system to:
provide a recycle list data structure that identifies memory pages on a recycle list including at least some memory pages that store portions of the queues, and that represents an order in which the identified memory pages are to be reused;
maintain the recycle list data structure including:
adding a first memory page to a first end of the recycle list in response to a write pointer moving off the first memory page; and
adding a second memory page to a second end of the recycle list in response to a queue that uses the second memory page being closed;
provide a free list data structure that identifies memory pages on a free list that are unallocated;
provide a volatile memory store;
provide a non-volatile memory store; and
reuse the first memory page identified by the recycle list in response to the free list being empty the after writing contents of the first memory page from the volatile memory store to the non-volatile memory store.

20. A system for paging memory used for one or more queues, including:
means for providing a recycle list data structure that identifies memory pages on a recycle list including at least some memory pages that store portions of the queues, and that represents an order in which the identified memory pages are to be reused;
means for maintaining the recycle list data structure including:
adding a first memory page to a first end of the recycle list in response to a write pointer moving off the first memory page; and
adding a second memory page to a second end of the recycle list in response to a queue that uses the second memory page being closed;
means for providing a free list data structure that identifies memory pages on a free list that are unallocated;
a volatile memory store;
a non-volatile memory store; and
means for reusing the first memory page identified by the recycle list in response to the free list in being empty after writing the contents of the first memory page from the volatile memory store to the non-volatile memory store.

* * * * *